(12) United States Patent
Sato et al.

(10) Patent No.: US 11,371,500 B2
(45) Date of Patent: Jun. 28, 2022

(54) FLOATING RING TYPE MECHANICAL SEAL

(71) Applicant: NIPPON PILLAR PACKING CO., LTD., Osaka (JP)

(72) Inventors: Yuji Sato, Osaka (JP); Takashi Nishi, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 60 days.

(21) Appl. No.: 15/527,239

(22) PCT Filed: Feb. 19, 2016

(86) PCT No.: PCT/JP2016/054866
§ 371 (c)(1),
(2) Date: May 16, 2017

(87) PCT Pub. No.: WO2016/143485
PCT Pub. Date: Sep. 15, 2016

(65) Prior Publication Data
US 2018/0023559 A1    Jan. 25, 2018

(30) Foreign Application Priority Data

Mar. 9, 2015   (JP) .............................. JP2015-045740

(51) Int. Cl.
*F16J 15/34*     (2006.01)
*F04B 53/14*     (2006.01)
(Continued)

(52) U.S. Cl.
CPC ............ *F04B 53/143* (2013.01); *F04B 39/00* (2013.01); *F04B 53/00* (2013.01); *F16J 15/3472* (2013.01);
(Continued)

(58) Field of Classification Search
CPC .. F16J 15/3476; F16J 15/3468; F16J 15/3436; F16J 15/3464; F16J 15/34;
(Continued)

(56) References Cited

U.S. PATENT DOCUMENTS 2,149,974 A * 3/1939 McCormack ........ F16J 15/3464
277/406
2,964,339 A * 12/1960 Macks .................. F16J 15/441
101/116
(Continued)

FOREIGN PATENT DOCUMENTS

CN    101133184 A    2/2008
CN    101424342 A    5/2009
(Continued)

OTHER PUBLICATIONS

Machine Translation—JP2005249131A Floating Ring Type Mechanical Seal; Yamanoi, Takeshi, Nippon Pillar Packing Co Ltd.*
(Continued)

*Primary Examiner* — Christine M Mills
*Assistant Examiner* — L. Susmitha Koneru
(74) *Attorney, Agent, or Firm* — Millen, White, Zelano & Branigan, PC; Ryan Pool (57) ABSTRACT

Provided is a floating ring type mechanical seal in which a floating ring is pinched and held between a rotary ring provided in a rotary shaft and a stationary ring provided in a seal casing to be movable in an axial direction while being urged toward the rotary ring so that a relative rotation of the floating ring with respect to the stationary ring is inhibited. The rotary ring is made of a sintered compact of SiC or cemented carbide. A diamond film is formed on a sealing surface sliding on the floating ring in the rotary ring. A diamond film continuous to the diamond film of the sealing surface is formed on an outer peripheral surface of the rotary (Continued)

ring and a rear surface, which is a surface opposite to the sealing surface, in the rotary ring.

6 Claims, 5 Drawing Sheets (51) Int. Cl.
 *F04B 39/00* (2006.01)
 *F04B 53/00* (2006.01)
(52) U.S. Cl.
 CPC ....... *F16J 15/3484* (2013.01); *F16J 15/3496* (2013.01); *F16J 15/3452* (2013.01)
(58) Field of Classification Search
 CPC .. F16J 15/3404; F16J 15/3496; F16J 15/3452; F04B 53/143
 See application file for complete search history.

(56) References Cited

U.S. PATENT DOCUMENTS

| | | | | | |
|---|---|---|---|---|---|
| 3,782,735 | A | * | 1/1974 | Novosad | F16J 15/3496 |
| | | | | | 277/360 |
| 3,948,533 | A | * | 4/1976 | Novosad | F16J 15/3464 |
| | | | | | 277/370 |
| 4,256,313 | A | * | 3/1981 | Arnold | F16J 15/3464 |
| | | | | | 277/370 |
| 4,489,951 | A | * | 12/1984 | Kataoka | F16J 15/3468 |
| | | | | | 277/362 |
| 4,639,000 | A | * | 1/1987 | Warner | F16J 15/3468 |
| | | | | | 277/373 |
| 5,863,047 | A | * | 1/1999 | Ellis | F16J 15/348 |
| | | | | | 277/374 |
| 8,267,406 | B2 | * | 9/2012 | Svejkovsky | F16J 15/38 |
| | | | | | 277/390 |
| 9,841,107 | B2 | | 12/2017 | Otschik et al. | |
| 10,823,291 | B2 | * | 11/2020 | Sakakura | F16J 15/3464 |
| 2009/0060408 | A1 | | 3/2009 | Nagasaka et al. | |
| 2010/0061676 | A1 | | 3/2010 | Sugiyama et al. | |
| 2014/0265145 | A1 | * | 9/2014 | Copeland, III | F02C 7/28 |
| | | | | | 277/405 |
| 2016/0053895 | A1 | | 2/2016 | Otschik et al. | |
| 2016/0230892 | A1 | * | 8/2016 | Yoshino | F16J 15/348 |
| 2017/0370475 | A1 | * | 12/2017 | Sakakura | F04B 53/143 |
| 2019/0154156 | A1 | * | 5/2019 | Sakakura | F16J 15/34 |

FOREIGN PATENT DOCUMENTS

| | | | | |
|---|---|---|---|---|
| CN | 101603595 | A | 12/2009 | |
| CN | 101663495 | A | 3/2010 | |
| CN | 101748370 | A | 6/2010 | |
| CN | 105074299 | A | 11/2015 | |
| DE | 2006-637890 | * | 9/2006 | ........... F16J 15/3496 |
| DE | 202006009762 | * | 9/2006 | ............... F16J 15/34 |
| DE | 102013005926 | A1 | 10/2014 | |
| EP | 1304485 | A1 * | 4/2003 | ............... F04D 7/06 |
| JP | 2002-321991 | A | 11/2002 | |
| JP | 2005-249131 | A | 9/2005 | |
| JP | 2005249131 | A * | 9/2005 | |
| JP | 2005302856 | A | 10/2005 | |
| JP | 2005-315392 | A | 11/2005 | |
| JP | 2009-156294 | A | 7/2009 | |
| JP | 2012-251617 | A | 12/2012 | |
| WO | 07147508 | A1 | 12/2007 | |
| WO | 2014161704 | A1 | 10/2014 | |

OTHER PUBLICATIONS

Machine Translation of of JP-2005249131, Publication Date: Sep. 15, 2005.
Machine Translation of JP-2005-315392, Publication Date: Nov. 10, 2005.
Machine Translation of JP2002321991, Publication Date: Nov. 8, 2002.
Machine Translation of JP2009156294, Publication Date: Jul. 16, 2009.
Machine Translation of JP2012251617, Publication Date: Dec. 20, 2012.
International Search Report for PCT/JP2016/054866 dated Apr. 19, 2016.
English Abstract of JP-2005249131, Publication Date: Sep. 15, 2005.
English Abstract of JP-2005-315392, Publication Date: Nov. 10, 2005.
English Abstract of JP2002321991, Publication Date: Nov. 8, 2002.
English Abstract of JP2009156294, Publication Date: Jul. 16, 2009.
English Abstract of JP2012251617, Publication Date: Dec. 20, 2012.
English Machine Translation of CN101603595, Publication Date: Dec. 16, 2009.
English Machine Translation of CN101424342, Publication Date: May 6, 2009.
English Machine Translation of Abstract of CN101748370, Publication Date: Jun. 23, 2010.
English Machine Translation of JP2005302856, Publication Date: Oct. 27, 2005.
Office Action for related Chinese Patent Application No. 201680014674.4 dated Sep. 25, 2018.
Office Action for related Japanese Patent Application No. 2015045740 dated Nov. 6, 2018.
Extended European Search Report issued for Corresponding EP Patent Application No. 16761457.7 dated Oct. 26, 2018.

\* cited by examiner

Prior Art

FIG. 5

FLOATING RING TYPE MECHANICAL SEAL

TECHNICAL FIELD

The present invention relates to a floating ring type mechanical seal. More particularly, the invention relates to a floating ring type mechanical seal in which a floating ring is pinched and held between a rotary ring provided in a rotary shaft and a stationary ring provided in a seal casing.

BACKGROUND ART

Hitherto, various floating ring type mechanical seals have been proposed as shaft seal means in an apparatus used under a high-pressure and high-temperature condition like, for example a boiler feed pump (BFP) supplying water to a boiler of a thermal power plant (for example, see Patent Literatures 1 and 2).

Figure 5:
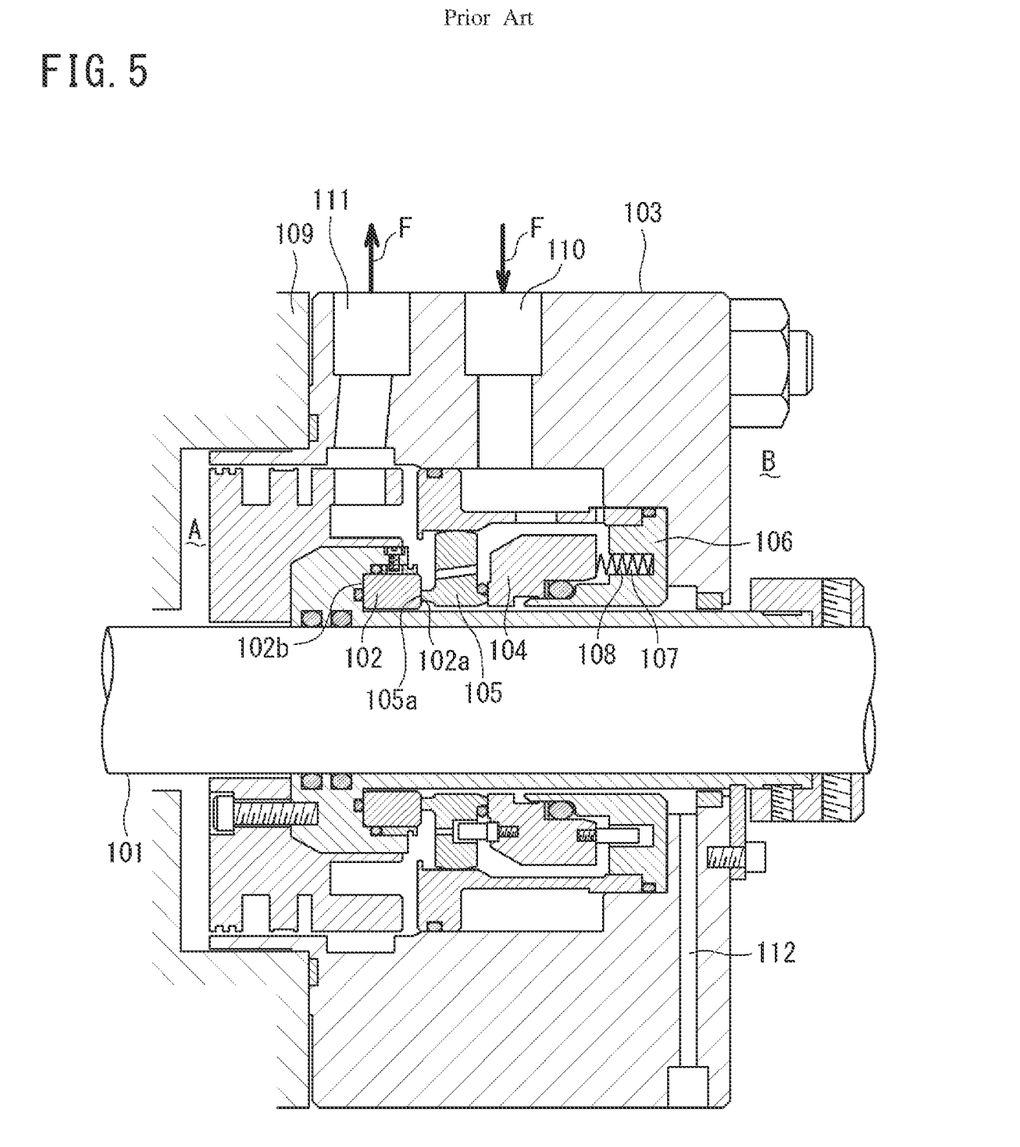
FIG. 5 is a longitudinal sectional view illustrating an example of a conventional mechanical seal.

As illustrated in FIG. 5, such floating ring type mechanical seal includes a rotary ring 102 which is provided in a rotary shaft 101, a stationary ring 104 which is provided in a seal casing 103, and a floating ring 105. The stationary ring 104 is provided in the seal casing 103 to be movable in an axial direction (in FIG. 5, the left/right direction) while being urged toward the rotary ring 102. The stationary ring 104 is urged toward the rotary ring 102 by a spring 108 disposed inside a recess 107 formed in a spring retainer 106 attached to the seal casing 103. Additionally, in FIG. 5, reference numeral 109 denotes a pump casing and reference numerals 110 and 111 respectively denote a supply passage and a discharge passage which are formed in the seal casing 103 so that a flushing liquid F flows therethrough. Further, reference numeral 112 denotes a drain which is also formed in the same seal casing 103.

The floating ring 105 is pinched and held between the stationary ring 104 and the rotary ring 102 while a relative rotation with respect to the stationary ring 104 is inhibited. Then, in the floating ring type mechanical seal illustrated in FIG. 5, a sealed fluid region A which is an outer peripheral region of a relative rotation sliding contact portion and a non-sealed fluid region (an atmospheric region) B which is an inner peripheral region thereof are shielded and sealed by a relative rotation sliding contact action between sealing surfaces 102a and 105a which are contact surfaces of the rotary ring 102 and the floating ring 105.

In such a floating ring type mechanical seal, since the floating ring 105 which exhibits a sealing function by the relative rotation sliding contact action with respect to the rotary ring 102 is pinched and held between the rotary ring 102 and the stationary ring 104, and both ends thereof in the axial direction are substantially symmetrical to each other, an influence caused by a fluid pressure of the sealed fluid region can be received in a well balanced manner in the axial direction. That is, a pressure distortion caused in the floating ring 105 is substantially the same at both ends thereof and a large distortion with respect to the axis does not occur. Thus, even under a high load condition in which a PV value (which is expressed by MPa/m/s and is a product of a rotation speed V (m/s) of the sealing surface and a contact pressure P (MPa) between the sealing surfaces) is large, the sealing surface 105a of the floating ring 105 is not inclined with respect to the sealing surface 102a of the rotary ring 102 and the parallelism of both sealing surfaces 102a and 105a is ensured, thereby exhibiting a satisfactory sealing function.

However, when a pump is operated under a severe load condition of, for example, PV=20 MPa/m/s or more, a large friction heat is generated on the sealing surface 102a of the rotary ring 102. When the pump is operated in such a state, a temperature difference occurs between the sealing surface 102a of the rotary ring 102 and the other portion of the rotary ring 102, in particular, a rear surface (a surface opposite to the sealing surface 102a) 102b which is away from the sealing surface 102a and thus a thermal distortion may occur in the rotary ring 102 due to this temperature difference. When the thermal distortion occurs in the rotary ring 102, the sealing surface 102a of the rotary ring 102 and the sealing surface 105a of the floating ring 105 cannot maintain parallelism. As a result, there is a concern that a sealing function may be deteriorated.

On the other hand, a mechanical seal disclosed in Patent Literature 3 is not a mechanical seal having a floating ring, but a groove is formed on an outer peripheral surface of a sleeve fixed to an outer periphery of a rotary shaft to generate an air flow toward a sliding surface between a rotary ring and a stationary ring so that the sliding surface is cooled by this air flow.

CITATION LIST

Patent Literature

Patent Literature 1: JP 2005-249131 A Patent Literature 2: JP 2009-156294 A

Patent Literature 3: JP 2012-251617 A

SUMMARY OF INVENTION

Technical Problem

When a cooling mechanism disclosed in Patent Literature 3 is applied to the floating ring type mechanical seal, a certain degree of cooling effect on the sliding surface can be expected. As a result, a temperature difference between the sliding surface and the rear surface can be slightly attempered, but it is not easy to perform groove processing on the outer peripheral surface of the sleeve in order to generate a fluid flow in a predetermined direction.

The invention has been made in view of such circumstances and an objective of the invention is to provide a floating ring type mechanical seal capable of preventing or inhibiting a thermal distortion occurring in a rotary ring due to a temperature difference between a sealing surface of the rotary ring and the other portion, in particular, a rear surface and expanding an application or use range of a mechanical seal.

Solution to Problem (1) A floating ring type mechanical seal (hereinafter, simply referred to as a "mechanical seal") according to a first aspect of the invention is a floating ring type mechanical seal in which a floating ring is pinched and held between a rotary ring provided in a rotary shaft and a stationary ring provided in a seal casing to be movable in an axial direction while being urged toward the rotary ring so that a relative rotation of the floating ring with respect to the stationary ring is inhibited, wherein the rotary ring is made of a sintered compact of SiC or cemented carbide, and wherein a diamond film is formed on a sealing surface sliding on the floating ring in the rotary ring and a diamond film continuous to the diamond film of the sealing surface is formed on an outer peripheral surface of the rotary ring and a rear surface, which is a surface opposite to the sealing surface, in the rotary ring.

In the mechanical seal according to the first aspect of the invention, a diamond film continuous to the diamond film of the sealing surface is formed on the outer peripheral surface of the rotary ring and the rear surface which is the surface opposite to the sealing surface in the rotary ring. The diamond film has large thermal conductivity of 1000 to 2000 W/m·k. For this reason, friction heat generated in the sealing surface which is the sliding surface in the rotary ring can be promptly transmitted to the diamond film formed on the rear surface of the rotary ring through the diamond film formed on the outer peripheral surface of the rotary ring. Accordingly, a temperature difference between the sealing surface and the rear surface of the rotary ring is attempered, so that a thermal distortion occurring in the rotary ring due to the temperature difference can be prevented or inhibited. As a result, since the parallelism of the sealing surface of the rotary ring and the sealing surface of the floating ring can be maintained, a stable sliding characteristic can be exhibited for a long period even under a high-load condition.

(2) A mechanical seal according to a second aspect of the invention is a floating ring type mechanical seal in which a floating ring is pinched and held between a rotary ring provided in a rotary shaft and a stationary ring provided in a seal casing to be movable in an axial direction while being urged toward the rotary ring so that a relative rotation of the floating ring with respect to the stationary ring is inhibited, wherein the rotary ring is made of a sintered compact of SiC or cemented carbide, and wherein a diamond film is formed on a sealing surface sliding on the floating ring in the rotary ring and a diamond film continuous to the diamond film of the sealing surface is formed on an inner peripheral surface of the rotary ring and a rear surface, which is a surface opposite to the sealing surface, in the rotary ring.

In the mechanical seal according to the second aspect of the invention, a diamond film continuous to the diamond film of the sealing surface is formed on the inner peripheral surface of the rotary ring and the rear surface, which is the surface opposite to the sealing surface in, the rotary ring. The diamond film has large thermal conductivity of 1000 to 2000 W/m·k. For this reason, friction heat generated in the sealing surface which is the sliding surface in the rotary ring can be promptly transmitted to the diamond film formed on the rear surface of the rotary ring through the diamond film formed on the inner peripheral surface of the rotary ring. Accordingly, a temperature difference between the sealing surface and the rear surface of the rotary ring is attempered, so that a thermal distortion occurring in the rotary ring due to the temperature difference can be prevented or inhibited. As a result, since the parallelism of the sealing surface of the rotary ring and the sealing surface of the floating ring can be maintained, a stable sliding characteristic can be exhibited for a long period even under a high-load condition.

(3) A mechanical seal according to a third aspect of the invention is a floating ring type mechanical seal in which a floating ring is pinched and held between a rotary ring provided in a rotary shaft and a stationary ring provided in a seal casing to be movable in an axial direction while being urged toward the rotary ring so that a relative rotation of the floating ring with respect to the stationary ring is inhibited, wherein the rotary ring is made of a sintered compact of SiC or cemented carbide, and wherein a diamond film is formed on a sealing surface sliding on the floating ring in the rotary ring and a diamond film continuous to the diamond film of the sealing surface is formed on an inner peripheral surface of the rotary ring and an outer peripheral surface of the rotary ring.

In the mechanical seal according to the third aspect of the invention, a diamond film continuous to the diamond film of the sealing surface is formed on the inner peripheral surface of the rotary ring and the outer peripheral surface of the rotary ring. The diamond film has large thermal conductivity of 1000 to 2000 W/m·k. For this reason, friction heat generated in the sealing surface which is the sliding surface in the rotary ring can be promptly transmitted to the inner peripheral side and the outer peripheral side of the rotary ring through the diamond film formed on the inner peripheral surface and the outer peripheral surface of the rotary ring. Accordingly, a temperature difference among the sealing surface, the outer peripheral surface, and the inner peripheral surface of the rotary ring is attempered, so that a thermal distortion occurring in the rotary ring due to the temperature difference can be prevented or inhibited. As a result, since the parallelism of the sealing surface of the rotary ring and the sealing surface of the floating ring can be maintained, a stable sliding characteristic can be exhibited for a long period even under a high-load condition.

(4) In the mechanical seal of (1) or (3), a heat transfer ring is preferably provided on an outer periphery of a diamond film formed on the outer peripheral surface. In this case, since friction heat generated in the sealing surface of the rotary ring can be transmitted to the rear surface of the rotary ring through the heat transfer ring in addition to the diamond film of the outer peripheral surface, a temperature difference between the sealing surface and the rear surface of the rotary ring can be further effectively attempered. Further, the diamond film can be protected from a mechanical vibration transmitted to the mechanical seal by the heat transfer ring.

(5) In the mechanical seal according to any one of (1) to (4), the diamond film can have thermal conductivity of 1000 to 2000 W/m·k.

Advantageous Effects of Invention

According to the mechanical seal of the present invention, it is possible to effectively prevent or inhibit the thermal distortion occurring in the rotary ring due to the temperature difference between the sealing surface of the rotary ring and the other portion, particularly, the rear surface.

DESCRIPTION OF EMBODIMENTS

Hereinafter, embodiments of a mechanical seal of the present invention will be described in detail with reference to the accompanying drawings.

First Embodiment

Figure 1:
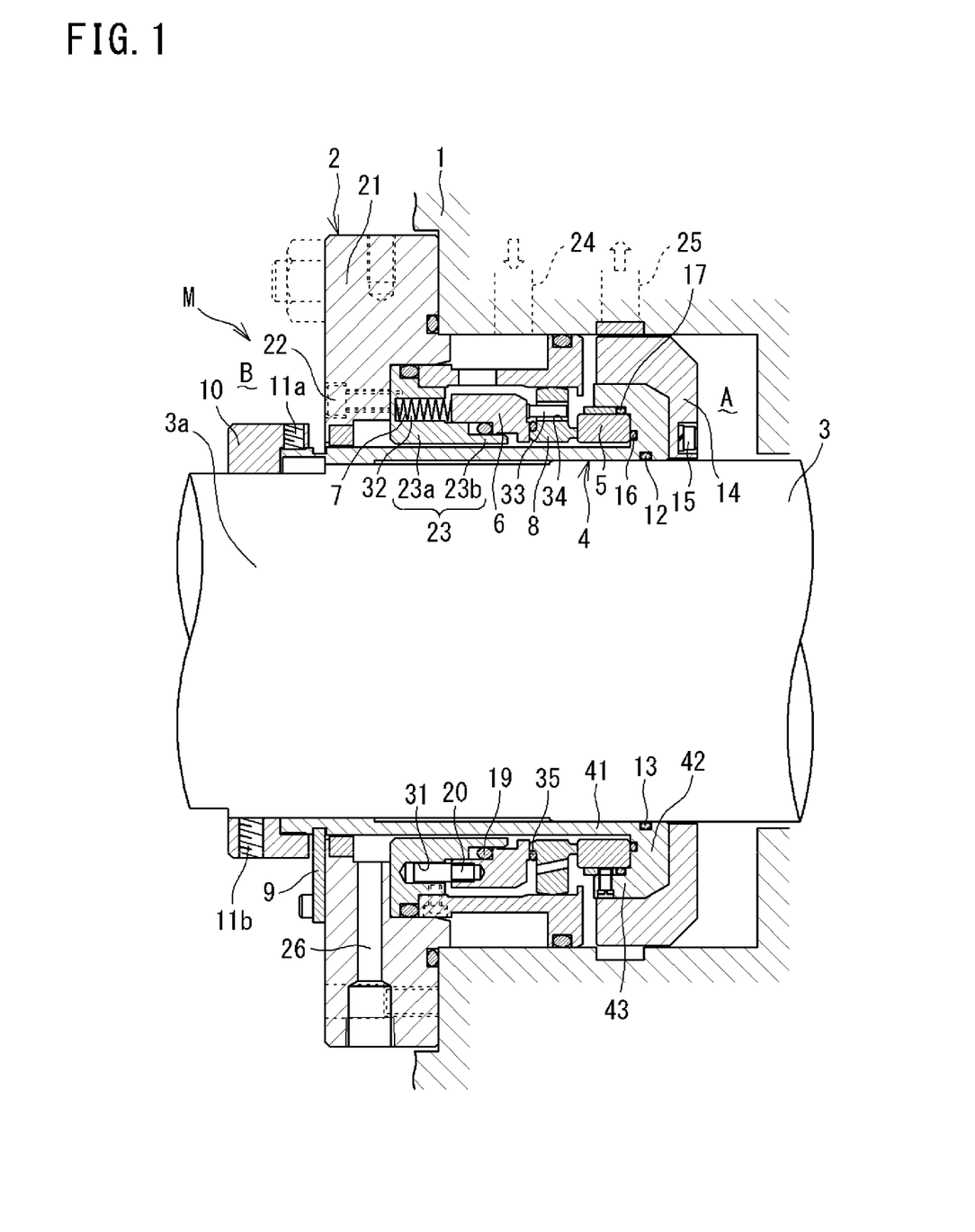
FIG. 1 is a longitudinal sectional view illustrating a mechanical seal of a first embodiment of the present invention.
Figure 2:
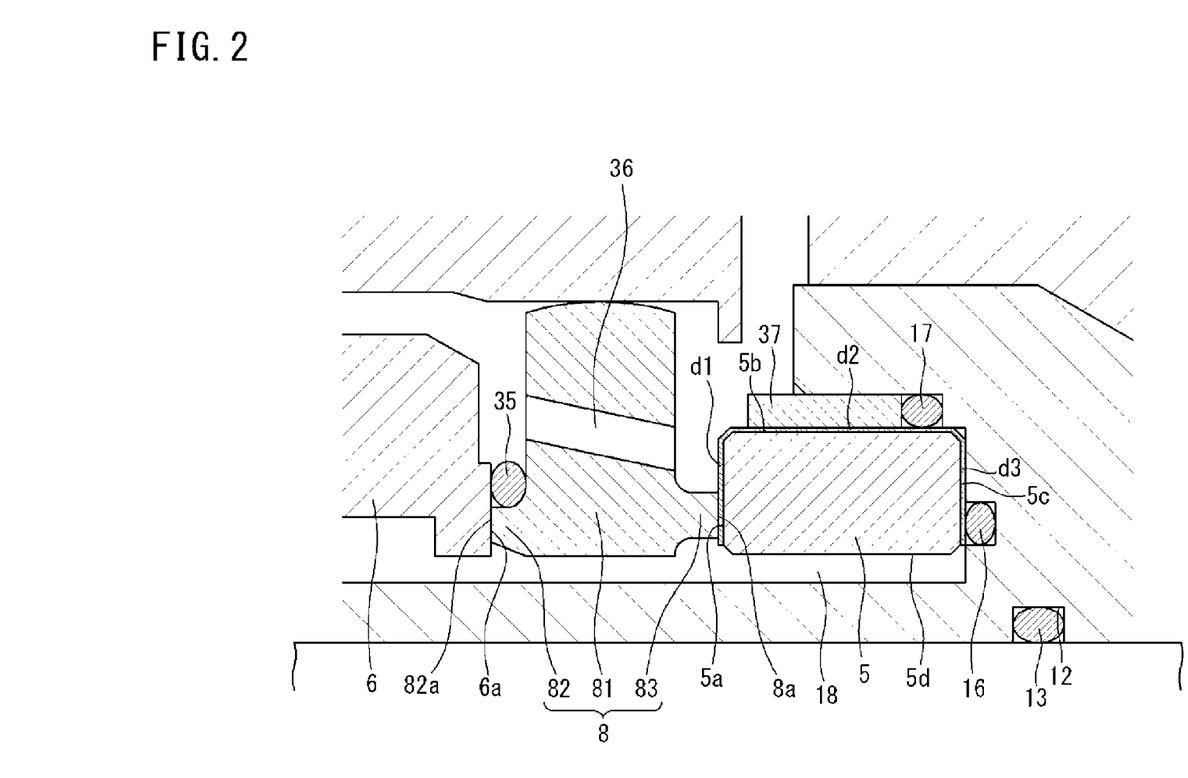
FIG. 2 is an enlarged view illustrating a main part of the mechanical seal illustrated in FIG. 1.

FIG. 1 is a longitudinal sectional view illustrating a mechanical seal M according to a first embodiment of the present invention and FIG. 2 is an enlarged view illustrating a main part of the mechanical seal M illustrated in FIG. 1. Additionally, in FIGS. 2 to 4, a film thickness of a diamond film is exaggerated for clarity. The mechanical seal M according to the present embodiment is a floating ring type mechanical seal appropriately used as, for example, a shaft seal means in a BFP (Boiler Feed Pump) which supplies water to a boiler of a thermal power plant, has a high pressure of a fluid to be sealed, and can cause a large pressure fluctuation depending on an operation condition.

The mechanical seal M comprises a seal casing 2 which is attached to a pump casing 1, a sleeve 4 which is fixed to the outer periphery of a rotary shaft 3 protruding from the pump casing 1 while passing through the pump casing 1, a rotary ring 5 which is provided in the sleeve 4, a stationary ring 6 which is provided to face the rotary ring 5, a spring 7 which is disposed between the seal casing 2 and the stationary ring 6, a floating ring 8 which is pinched and held between the rotary ring 5 and the stationary ring 6, and a set plate 9 which connects the seal casing 2 and the sleeve 4 so that the rotary ring 5, the stationary ring 6, and the floating ring 8 are disposed at predetermined positions when the mechanical seal M is attached to equipment. The mechanical seal M is a cartridge type mechanical seal in which a sealed fluid region (a region communicating with an interior region of the BFP) A corresponding to an outer peripheral region of a relative rotation sliding contact portion and a non-sealed fluid region (an atmospheric region which is an exterior region of the BFP) B corresponding to an inner peripheral region of the relative rotation sliding contact portion are shielded and sealed by a relative rotation sliding contact action between the rotary ring 5 and the floating ring 8. Additionally, in the following description, a left side of FIGS. 1 and 2 will be referred to as an exterior side or a rear side and a right side thereof will be referred to as an interior side or a front side.

The seal casing 2 is attached to an end of the pump casing 1 while concentrically surrounding a rotary shaft portion 3a protruding from the pump casing 1. The seal casing 2 has a cylindrical shape and comprises a main body portion 21, a wall 22, and a spring retainer 23. The main body portion 21 is a cylindrical member and one end thereof engages with the pump casing 1 while contacting the pump casing 1. The wall 22 is an annular member that is integrally formed with the main body portion 21 at the inner periphery of the other end (an end which is opposite to an end engaging with the pump casing 1) of the main body portion 21. The spring retainer 23 is attached to the inner surface side of the wall 22. The spring retainer 23 is composed of an annular spring holding portion 23a which is attached to the wall 22 and a cylindrical stationary ring holding portion 23b which protrudes toward the interior side from the spring holding portion 23a. The pump casing 1 is provided with a supply passage 24 and a discharge passage 25 for a flushing liquid (water) F. Further, the seal casing 2 is provided with a drain 26.

The sleeve 4 is composed of a cylindrical main body portion 41 which is inserted through the rotary shaft portion 3a, a first holding portion 42 which is formed in an annular shape and is formed in a front end (an interior side end) of the main body portion 41, and a second holding portion 43 which is formed in a cylindrical shape and protrudes toward the exterior side from the outer peripheral portion of the first holding portion 42. The sleeve 4 is fixed to the outer periphery of the rotary shaft 3 while being positioned inside the seal casing 2 except for a base end portion (which is a rear end portion and a portion positioned at the exterior side) of the main body portion 41. More specifically, by fixing a stopper ring 10 inserted through the rotary shaft 3 to the base end portion of the main body portion 41 protruding from the seal casing 2 toward the exterior side by a plurality of first set screws 11a, and by fixing the stopper ring 10 to the rotary shaft 3 by a plurality of second set screws 11b, the sleeve 4 is detachably fixed to the rotary shaft 3. The inner periphery of the first holding portion 42 is provided with an O-ring groove 12 and a gap between the rotary shaft 3 and the sleeve 4 is (secondly) sealed by an O-ring 13 disposed inside the O-ring groove 12. Additionally, a pumping ring 14 used for circulating the flushing liquid is attached to a front end of the sleeve 4 by a cap bolt 15.

The rotary ring 5 is held by the rotary shaft 3 through a plurality of O-rings 16 and 17 to be displaceable or deformable in the radial direction and the axial direction (the axial direction of the rotary shaft 3) in the elastic deformation range of the O-rings 16 and 17. Additionally, as illustrated in FIG. 2, an annular gap 18 which allows a displacement or a deformation of the rotary ring 5 in the radial direction is formed between the inner peripheral surface of the rotary ring 5 and the outer peripheral surface of the main body portion 41 of the sleeve 4 facing the inner peripheral surface. The rotary ring 5 is made of a sintered compact of SiC and the sintered compact can be obtained, for example, by room temperature sintering or reactive sintering of SiC. The thermal conductivity of the obtained sintered compact of SiC is 70 to 120 W/mK. Further, the rotary ring 5 may be made of cemented carbide (WC).

The stationary ring 6 is held by the seal casing 2 through an O-ring 19 and a drive pin 20 to be movable in the axial direction while a relative rotation therebetween is not allowed. More specifically, the stationary ring 6 is held by the seal casing 2 in such a manner that a base end portion thereof is loosely inserted into the stationary ring holding portion 23b of the spring retainer 23 through the O-ring 19. The stationary ring 6 is held by the seal casing 2 to be movable in the axial direction while a gap with respect to the seal casing 2 is (secondly) sealed by the O-ring 19. Further, a plurality of drive pins 20 protrude from a base end of the stationary ring 6 in parallel to the axis and the drive pins 11 respectively engage with a plurality of engagement recesses 31 formed in the spring holding portion 23a of the spring retainer 23, so that the stationary ring 6 can move in the axial direction within a predetermined range, but cannot rotate relative to the seal casing 2. The stationary ring 6 can be made of, for example, hard metal such as stainless steel.

The spring 7 is held by the plurality of engagement recesses 32 which are formed at the same interval in the circumferential direction of the spring holding portion 23a of the spring retainer 23. The spring 7 contacts a rear surface (a rear end surface) of the stationary ring 6 while urging the stationary ring 6 toward the rotary ring.

The floating ring 8 includes an annular main body portion 81 and a pressing portion 82 and a sealing portion 83 which are integrally formed with front and rear ends at the inner peripheral side of the main body portion 81 to have substantially the same annular shape. The floating ring 8 is pinched and held between the rotary ring 5 and the stationary ring 6 by an urging force generated by the spring 7 while a pressing surface 82a which is an end surface of the pressing portion 82 contacts a pressing surface 6a which is a front end surface (a rear end surface) of the stationary ring 6 and a sealing surface 83a which is an end surface of the sealing portion 83 contacts a sealing surface 5a which is a front end surface (a rear end surface) of the rotary ring 5.

A plurality of drive pins 33 protruding from a front end of the stationary ring 6 at the same interval in the circumferential direction engage with an engagement hole 34 formed in the main body portion 81, so that the floating ring 8 is held by the stationary ring 6 to be relatively movable within a predetermined range in the axial direction and the radial direction while a relative rotation therebetween is not allowed. An O-ring 35 which (secondly) seals a gap between the stationary ring 6 and the floating ring 8 is disposed between opposite end surfaces of the stationary ring 6 and the main body portion 81 of the floating ring 8 in the axial direction. A plurality of through holes 36 are formed at the same interval in the circumferential direction of the main body portion 81 of the floating ring 8. The floating ring 8 can be made of a material softer than a material forming the rotary ring 5, for example, carbon.

In the present embodiment, a diamond film d1 is formed on the sealing surface 5a sliding on the floating ring 8 in the rotary ring 5 and a diamond film d2 and a diamond film d3 continuous to the diamond film d1 of the sealing surface 5a are respectively formed on an outer peripheral surface 5b and a rear surface 5c of the rotary ring 5. For this reason, the abrasion resistance of the sealing surface 5a is improved. Further, since and the diamond films d1 and d2 have large thermal conductivity of 1000 to 2000 W/m·k, friction heat generated in the sealing surface 5a which is the sliding surface of the rotary ring 5 can be promptly transmitted from the diamond film d1 of the sealing surface 5a to the diamond film d3 formed on the rear surface 5c of the rotary ring 5 through the diamond film d2 formed on the outer peripheral surface 5b. Accordingly, a temperature difference between the sealing surface 5a and the rear surface 5c of the rotary ring 5 is attempered, so that a thermal distortion occurring in the rotary ring 5 due to the temperature difference can be prevented or inhibited. In other words, since the friction heat generated in the sealing surface 5a of the rotary ring 5 is promptly transmitted to the rear surface 5c of the rotary ring 5 through the diamond film having large thermal conductivity, a collapse in thermal balance (a thermal balance between a portion near the sealing surface 5a and a portion near the rear surface 5c) of the rotary ring 5 can be prevented or inhibited. As a result, the parallelism of the sealing surface 5a of the rotary ring 5 and the sealing surface 8a of the floating ring 8 can be maintained, so that a stable sliding characteristic can be exhibited for a long period even under a high-load condition of, for example, PV=20 MPa/m/s or more.

The diamond film can be manufactured by, for example, a general manufacturing method such as a microwave CVD method and a hot filament CVD method. Further, the thickness of the diamond film is not particularly limited in the present invention, but it is generally 3 to 20 μm and preferably 3 to 10 μm. From the viewpoint of moving the friction heat generated in the sealing surface 5a of the rotary ring 5 to the diamond film d2 of the outer peripheral surface 5b before the friction heat moves to a SiC sintered compact which is a base material of the rotary ring 5, a thickness of 3 μm or more is desirable. Further, a thickness of 10 μm or less is desirable from the viewpoint of reducing a residual stress of the diamond film as much as possible in addition to a reason in which the surface roughness of the diamond film increases in accordance with an increase in thickness of the diamond film so that the diamond film is not easily used as a sealing surface of a mechanical seal of a precise mechanical part.

The thickness of the diamond film d1 may be equal to or different from those of the diamond films d2 and d3. From the viewpoint of promptly moving the friction heat generated in the sealing surface 5a of the rotary ring 5 to the diamond film d2 of the outer peripheral surface 5b, it is desirable that the film thickness of the diamond film d2 of the outer peripheral surface 5b be equal to or larger than the film thickness of the diamond film d1 of the sealing surface 5a.

In the present embodiment, a heat transfer ring 37 is provided at the further outer peripheral side of the diamond film d2 formed on the outer peripheral surface 5b of the rotary ring 5. The heat transfer ring 37 is made of, for example, metal such as titanium and SUS 403 and is shrink-fitted to the outer periphery of the diamond film d2. The thermal conductivities of titanium and SUS 403 are respectively 17.4 W/m·k and 24.9 to 25.7 W/m·k and are smaller than that of diamond or SiC. However, when such a heat transfer ring 37 is shrink-fitted to the outer periphery of the diamond film d2, heat transmitted from the diamond film d1 can be transmitted to the rear surface 5c of the rotary ring 5 through the heat transfer ring 37 and the first holding portion 42 of the sleeve 4 in addition to the diamond film d2 and thus a temperature difference between the sealing surface 5a and the rear surface 5c of the rotary ring 5 can be further effectively attempered. Further, the diamond film d2 is brittle, but when the heat transfer ring 37 is provided at the outer periphery of the diamond film d2, the diamond film d2 can be protected from a mechanical vibration transmitted to the mechanical seal M.

Second Embodiment

Figure 3:
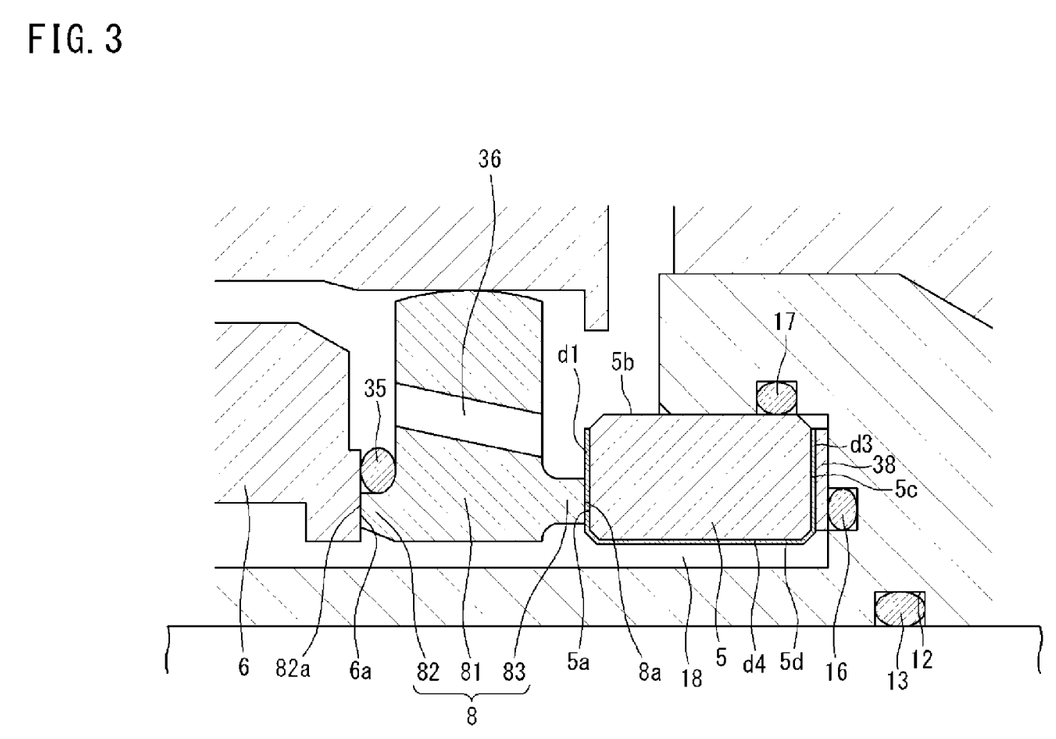
FIG. 3 is an enlarged view illustrating a main part of a mechanical seal of a second embodiment of the present invention.

FIG. 3 is an enlarged view illustrating a main part of a mechanical seal according to a second embodiment of the present invention. The mechanical seal according to the second embodiment and a mechanical seal according to a third embodiment to be described later are different from the mechanical seal M according to the first embodiment in that the rotary ring have a different configuration. However, other components such as the stationary ring or the floating ring have common configuration. Thus, the same reference numerals will be given to the same components and a description thereof will be omitted for simplicity.

In the present embodiment, a diamond film d1 is formed on a sealing surface 5a sliding on a floating ring 8 in a rotary ring 5 and a diamond film d4 continuous to the diamond film d1 of the sealing surface 5a and a diamond film d3 continuous to the diamond film d4 are respectively formed on an inner peripheral surface 5d and a rear surface 5c of the rotary ring 5. For this reason, the abrasion resistance of the sealing surface 5a is improved and friction heat generated in the sealing surface 5a which is a sliding surface of the rotary ring 5 can be promptly transmitted from the diamond film d1 of the sealing surface 5a to the diamond film d3 formed on the rear surface 5c of the rotary ring 5 through the diamond film d4 formed on the inner peripheral surface 5d. Accordingly, a temperature difference between the sealing surface 5a and the rear surface 5c of the rotary ring 5 is attempered, so that a thermal distortion occurring in the rotary ring 5 due to the temperature difference can be prevented or inhibited. In other words, since the friction heat generated in the sealing surface 5a of the rotary ring 5 is promptly transmitted to the rear surface 5c of the rotary ring 5 through the diamond film having large thermal conductivity, a collapse in thermal balance of the rotary ring 5 can be prevented or inhibited. As a result, the parallelism of the sealing surface 5a of the rotary ring 5 and the sealing surface 8a of the floating ring 8 can be maintained, so that a stable sliding characteristic can be exhibited for a long period even under a high-load condition.

Further, in the present embodiment, a gasket 38 is disposed to contact the rear surface 5c of the rotary ring 5, more specifically, the diamond film d3 formed on the rear surface 5c. The gasket 38 is made of a material having hardness Hs of 40 to 90. As such a material, for example, expanded graphite, heat-resistant silicone rubber, and the like can be exemplified. Since the relatively soft gasket 38 is disposed on the rear surface 5c of the rotary ring 5, the gasket 38 and the diamond film d3 formed on the rear surface 5c of the rotary ring 5 can be brought into close contact with each other. It is generally difficult to flatten the surface of the diamond film, but when the relatively soft gasket 38 is used, the roughness of the surface of the diamond film can be absorbed.

Third Embodiment

Figure 4:
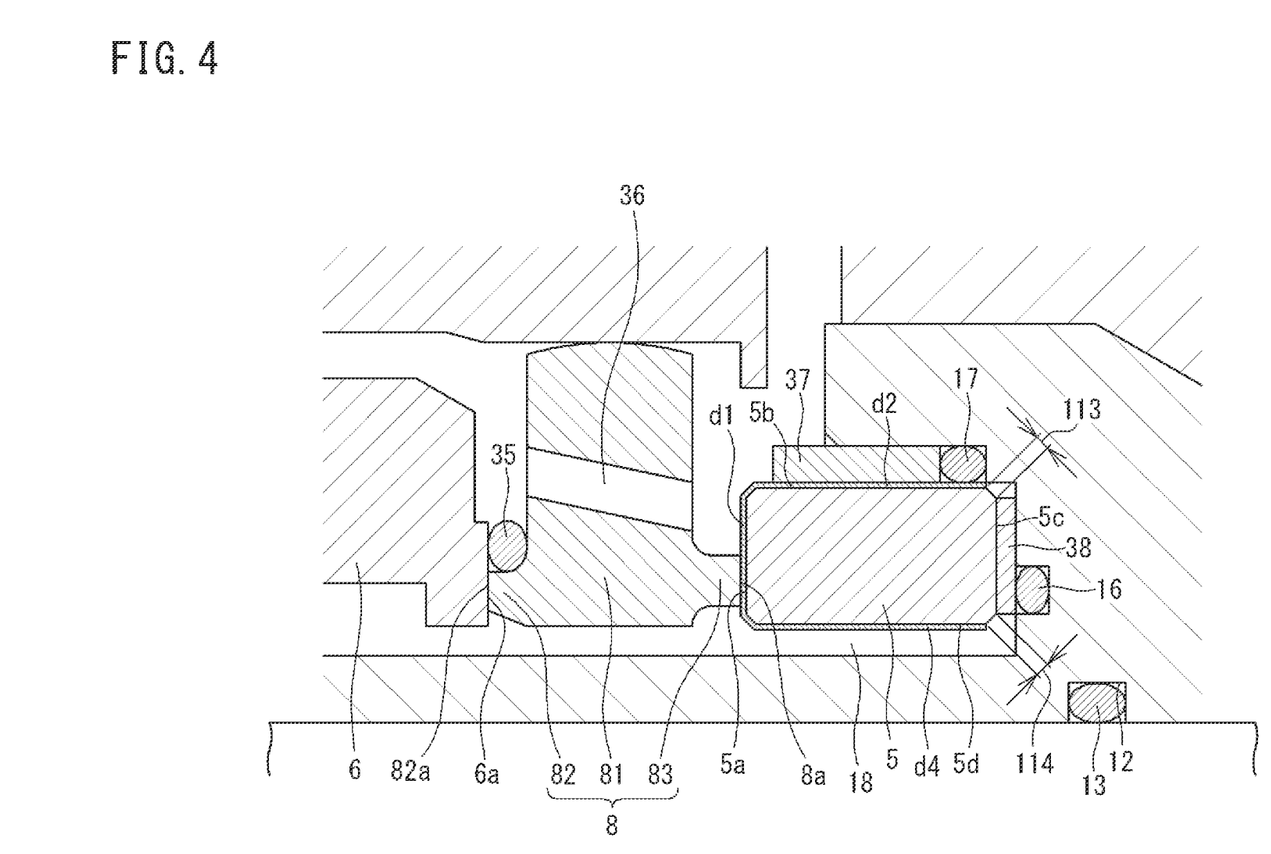
FIG. 4 is an enlarged view illustrating a main part of a mechanical seal of a third embodiment of the present invention.

FIG. 4 is an enlarged view illustrating a main part of a mechanical seal according to a third embodiment of the invention. In the present embodiment, diamond films d1, d2, and d4 are respectively formed on a sealing surface 5a, an outer peripheral surface 5b, and an inner peripheral surface 5d of a rotary ring 5. The diamond films d1, d2, and d4 are continuously formed. In this case, friction heat generated in the sealing surface 5a which is a sliding surface of the rotary ring 5 can be promptly transmitted to the inner peripheral side and the outer peripheral side of the rotary ring 5 through the diamond films d4 and d2 formed on the inner peripheral surface 5d and the outer peripheral surface 5b of the rotary ring 5, so that a temperature difference among the sealing surface 5a of the rotary ring 5, the outer peripheral surface, and the inner peripheral surface can be further effectively attempered.

Further, in the present embodiment, a heat transfer ring 37 is provided at the further outer periphery of the diamond film d2 formed on the outer peripheral surface 5b of the rotary ring 5 similarly to the first embodiment. When the heat transfer ring 37 is shrink-fitted to the outer periphery of the diamond film d2, heat transmitted from the diamond film d1 can be transmitted to the rear surface 5c of the rotary ring 5 through the heat transfer ring 37 in addition to the diamond film d2 and thus a temperature difference between the sealing surface 5a and the rear surface 5c of the rotary ring 5 can be further effectively attempered. Further, the diamond film d2 is brittle, but when the heat transfer ring 37 is provided at the outer periphery of the diamond film d2, the diamond film d2 can be protected from a mechanical vibration transmitted to the mechanical seal M.

Further, in the present embodiment, a gasket 38 is disposed to contact the rear surface 5c of the rotary ring 5, more specifically, the diamond film d3 formed on the rear surface 5c similarly to the second embodiment. Since such a gasket 38 is disposed on the rear surface 5c of the rotary ring 5, the gasket 38 and the rear surface 5c of the rotary ring 5 can be brought into close contact with each other. The first annular interval is identified by the reference number 113. The second annular interval is identified by the reference number 114.

Other Modification Examples

It should be noted that the mechanical seal of the present invention is not limited to the above-described embodiments and can be modified into various forms.

REFERENCE SIGNS LIST

1: Pump casing
2: Seal casing
3: Rotary shaft
4: Sleeve
5: Rotary ring
5a: Sealing surface
5b: Outer peripheral surface
5c: Rear surface
5d: Inner peripheral surface
6: Stationary ring
6a: Pressing surface
7: Spring
8: Floating ring
9: Set plate
10: Stopper ring
11a: First set screw
11b: Second set screw
12: O-ring groove
13: O-ring
14: Pumping ring
15: Cap bolt
16: O-ring
17: O-ring
18: Gap
19: O-ring
20: Drive pin
21: Main body portion
22: Wall
23: Spring retainer
23a: Stationary ring holding portion
23b: Spring holding portion
24: Supply passage
25: Discharge passage
26: Drain
31: Engagement recess
32: Engagement recess
33: Drive pin
34: Engagement hole
35: O-ring
36: Through hole
37: Heat radiation ring
38: Gasket
41: Main body portion
42: First holding portion
43: Second holding portion
81: Main body portion
82: Pressing portion
83: Sealing portion
101: Rotary shaft
102: Rotary ring
103: Seal casing
104: Stationary ring
105: Floating ring
106: Spring retainer
107: Recess
108: Spring
F: Flushing liquid
M: Mechanical seal
d1: Diamond film d2: Diamond film
d3: Diamond film
d4: Diamond film

The invention claimed is:

1. A floating ring type mechanical seal comprising:
a rotary ring provided on a rotary shaft;
a stationary ring provided in a seal casing to be movable in an axial direction while being urged toward the rotary ring; and
a floating ring pinched and held between the rotary ring and the stationary ring with a relative rotation of the floating ring with respect to the stationary ring being inhibited,
wherein the rotary ring is made of a sintered compact of SiC or cemented carbide,
wherein a diamond film is formed on a sealing surface of the rotary ring for sliding on the floating ring, and a diamond film, continuous to the diamond film of the sealing surface and to transmit heat from the sealing surface of the rotary ring to an inner peripheral surface and an outer peripheral surface of the rotary ring more quickly than the rotary ring transmits, is formed only on the inner peripheral surface of the rotary ring and the outer peripheral surface of the rotary ring such that the rotary ring includes an uncovered surface without the diamond film, wherein the uncovered surface is not the sealing surface,
wherein the floating ring type mechanical seal further comprises a heat transfer ring provided on an outer periphery of a diamond film formed on the outer peripheral surface,
wherein the heat transfer ring comprises a cylindrical shape and metal,
wherein the heat transfer ring has an inner periphery surface fitted in between a holding portion of a sleeve and the diamond film formed on the outer peripheral surface of the rotary ring to come into contact with an outer peripheral surface of the diamond film provided on the outer peripheral surface of the rotary ring
wherein the floating ring type mechanical seal further comprises:
a gasket sandwiched between a rear surface of the rotary ring and a facing surface of the holding portion facing the rear surface being a surface on an opposite side of the rotary ring from the sealing surface; and
an O-ring provided in a recess of the facing surface recessed in an axial direction of the rotary shaft, and the O-ring being axially sandwiched between the gasket and the recess,
wherein a first annular interval is provided between an outer peripheral edge of the gasket and an axial edge of the diamond film on the outer peripheral surface of the rotary ring, and
a second annular interval is provided between an inner peripheral edge of the gasket and an axial edge of the diamond film on the inner peripheral surface of the rotary ring.

2. The floating ring type mechanical seal according to claim 1, wherein the diamond film has thermal conductivity of 1000 to 2000 W/m·k.

3. The floating ring type mechanical seal according to claim 1, wherein a film thickness of the diamond film formed on the outer peripheral surface of the rotary ring is greater than a film thickness of the diamond film formed on the sealing surface.

4. The floating ring type mechanical seal according to claim 1, wherein the rotary ring is provided in the sleeve such that the heat transfer ring is fitted between the holding portion of the sleeve and the diamond film formed on the outer peripheral surface of the rotary ring.

5. The floating ring type mechanical seal according to claim 1, wherein the heat transfer ring is fitted to the outer periphery of the diamond film so that heat transmitted from the diamond film is transferred to the rear surface.

6. The floating ring type mechanical seal according to claim 1, wherein the heat transfer ring is positioned only on the outer periphery of the diamond film.

* * * * *